(12) United States Patent
Penalver, Jr.

(10) Patent No.: US 10,758,065 B2
(45) Date of Patent: Sep. 1, 2020

(54) ROOM AND SHOP ORGANIZER

(71) Applicant: John Penalver, Jr., Queens, NY (US)

(72) Inventor: John Penalver, Jr., Queens, NY (US)

(73) Assignee: John Penalver, Jr., Queens, NY (US)

( * ) Notice: Subject to any disclaimer, the term of this patent is extended or adjusted under 35 U.S.C. 154(b) by 0 days.

(21) Appl. No.: 16/003,979

(22) Filed: Jun. 8, 2018

(65) Prior Publication Data

US 2019/0014924 A1 Jan. 17, 2019

Related U.S. Application Data

(60) Provisional application No. 62/531,342, filed on Jul. 11, 2017.

(51) Int. Cl.
*A47F 5/08* (2006.01)
*A47B 96/14* (2006.01)
*F16B 2/08* (2006.01)

(52) U.S. Cl.
CPC ........ *A47F 5/0846* (2013.01); *A47B 96/1441* (2013.01); *A47B 96/1466* (2013.01); *F16B 2/08* (2013.01)

(58) Field of Classification Search
CPC ............ A47B 96/1441; A47B 96/1466; A47B 96/1475; A47B 96/1483; A47F 5/0846; A47F 5/0853; F16B 2/02; F16B 2/06; F16B 2/08
USPC ....... 211/89.01, 107, 120, 123, 124; 248/62, 248/313
See application file for complete search history.

(56) References Cited

U.S. PATENT DOCUMENTS

| 2,384,158 | A | * | 9/1945 | Carpenter | F16L 3/227 248/68.1 |
|---|---|---|---|---|---|
| 3,226,069 | A | * | 12/1965 | Clarke | F16L 3/227 248/73 |
| 3,633,857 | A | * | 1/1972 | Logan | F16L 3/14 248/62 |
| 3,894,707 | A | * | 7/1975 | Heard | F16B 2/08 248/230.9 |
| 4,391,376 | A | * | 7/1983 | Finnegan | A63C 11/028 211/70.5 |
| 4,524,937 | A | * | 6/1985 | Zizan | F16L 3/24 248/62 |
| 5,098,054 | A | * | 3/1992 | Dyer | F16B 2/08 248/225.11 |
| 5,105,509 | A | * | 4/1992 | Lilley | F16B 2/08 24/20 CW |
| D343,975 | S | * | 2/1994 | Penalver, Jr. | D6/567 |
| 5,487,518 | A | * | 1/1996 | McCraney | F24H 9/06 248/225.11 |
| 5,906,302 | A | * | 5/1999 | Spergel | A62B 25/00 224/250 |
| 7,261,256 | B2 | * | 8/2007 | Pattie | F16L 3/233 244/129.1 |

(Continued)

*Primary Examiner* — Joshua E Rodden

(57) ABSTRACT

A room and shop organizer comprising a wall-mounted horizontal track with attachable, adjustable rings for holding stored items structured and arranged for storing and organizing elongated, bulky items on a wall, instead of keeping such items lying around on the floor to provide both homeowners and trades workers with a simple and effective means of keeping these items neatly stored above floor surfaces, keeping small living and work spaces free of clutter while avoiding dangerous tripping hazards.

11 Claims, 3 Drawing Sheets

(56) References Cited

U.S. PATENT DOCUMENTS

| | | | |
|---|---|---|---|
| 8,413,933 B2* | 4/2013 | Benne | F16L 3/11 |
| | | | 248/62 |
| 9,127,807 B1* | 9/2015 | Holloway | F16M 13/022 |
| 9,303,792 B2* | 4/2016 | Heims | F16L 3/243 |
| 2014/0259566 A1* | 9/2014 | Rouleau | F16B 5/0685 |
| | | | 24/457 |

* cited by examiner

ROOM AND SHOP ORGANIZER

CROSS-REFERENCE TO RELATED APPLICATION

The present application is related to and claims priority from prior provisional application Ser. No. 62/531,342, filed Jul. 11, 2017 which application is incorporated herein by reference.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever. 37 CFR 1.71(d).

BACKGROUND OF THE INVENTION

The following includes information that may be useful in understanding the present invention(s). It is not an admission that any of the information provided herein is prior art, or material, to the presently described or claimed inventions, or that any publication or document that is specifically or implicitly referenced is prior art.

1. Field of the Invention

The present invention relates generally to the field of organizer devices and more specifically relates to a room and shop organizer comprising a wall-mounted horizontal track with attachable, adjustable rings for holding stored items structured and arranged for storing and organizing elongated, bulky items on a wall, instead of keeping such items lying around on the floor to provide both homeowners and trades workers with a simple and effective means of keeping these items neatly stored above floor surfaces, keeping small living and work spaces free of clutter while avoiding dangerous tripping hazards.

2. Description of the Related Art

A shelf is a flat horizontal plane which is used in a home, business, store, or elsewhere to hold items that are being displayed, stored, or offered for sale. It is raised off the ground and usually anchored/supported on its shorter length sides by brackets. It can also be held up by columns or pillars. A shelf is also known as a counter, ledge, mantel, or rack. Tables designed to be placed against a wall, possibly mounted, are known as console tables, and are similar to individual shelves.

A shelf can be attached to a wall or other vertical surface, be suspended from a ceiling, be a part of a free-standing frame unit, or it can be part of a piece of furniture such as a cabinet, bookcase, entertainment center, some headboards, and so on. Usually two to six shelves make up a unit, each shelf being attached perpendicularly to the vertical or diagonal supports and positioned parallel one above the other. Free-standing shelves can be accessible from either one or both longer length sides. A shelf with a hidden internal bracket is termed a floating shelf. A shelf or case designed to display books is a bookshelf.

Various attempts have been made to solve problems found in organizer device art. Among these are found in: U.S. Pat. No. 625,271 to William J. Lang; U.S. Pat. No. 1,783,749 to Roehl Louis M; U.S. Pat. No. 4,732,283 to Edmund W. Schmidt. This prior art is representative of organizer devices for vertically storing elongated objects.

Ideally, a room and shop organizer should be user-friendly and safe in-use and, yet would operate reliably and be manufactured at a modest expense. Thus, a need exists for a room and shop organizer comprising a wall-mounted horizontal track with attachable, adjustable rings for holding stored items structured and arranged for storing and organizing elongated, bulky items on a wall, instead of keeping such items lying around on the floor to provide both homeowners and trades workers with a simple and effective means of keeping these items neatly stored above floor surfaces, keeping small living and work spaces free of clutter while avoiding dangerous tripping hazards and to avoid the above-mentioned problems.

BRIEF SUMMARY OF THE INVENTION

In view of the foregoing disadvantages inherent in the known of organizer device art, the present invention provides a novel Room and Shop Organizer. The general purpose of the present invention, which will be described subsequently in greater detail is to provide a room and shop organizer comprising a wall-mounted horizontal track with attachable, adjustable rings for holding stored items structured and arranged for storing and organizing elongated, bulky items on a wall, instead of keeping such items lying around on the floor to provide both homeowners and trades workers with a simple and effective means of keeping these items neatly stored above floor surfaces, keeping small living and work spaces free of clutter while avoiding dangerous tripping hazards.

A room and shop organizer comprising: a base member and a plurality of ring holders. The base member includes an elongated flat back surface and an elongated front surface. Wherein the front surface includes an elongated channel therein.

The plurality of ring holders, each include a connector member and an elongated strap member. Wherein the connector member is adapted to be slidably received within the elongated channel of the base member. Wherein the connector member is adapted to be releasably secured within the elongated channel, such that the position of the connector member within the elongated channel can be adjusted. Wherein the elongated strap member is attached to the connector member and is adapted to releasably secure items to the connector member. Wherein the plurality of ring holders are adapted to be individually adjustably connected slid and releasably connected within the elongated channel of the base member, such that items of varying shapes and sizes can be releasably secured to the base member.

The present invention holds significant improvements and serves as a Room and Shop Organizer. For purposes of summarizing the invention, certain aspects, advantages, and novel features of the invention have been described herein. It is to be understood that not necessarily all such advantages may be achieved in accordance with any one particular embodiment of the invention. Thus, the invention may be embodied or carried out in a manner that achieves or optimizes one advantage or group of advantages as taught herein without necessarily achieving other advantages as may be taught or suggested herein. The features of the invention which are believed to be novel are particularly pointed out and distinctly claimed in the concluding portion of the specification. These and other features, aspects, and advantages of the present invention will become better understood with reference to the following drawings and detailed description.

BRIEF DESCRIPTION OF THE DRAWINGS

The figures which accompany the written portion of this specification illustrate embodiments and method(s) of use for the present invention, a Room and Shop Organizer, constructed and operative according to the teachings of the present invention.

The various embodiments of the present invention will hereinafter be described in conjunction with the appended drawings, wherein like designations denote like elements.

DETAILED DESCRIPTION

Figure 1:
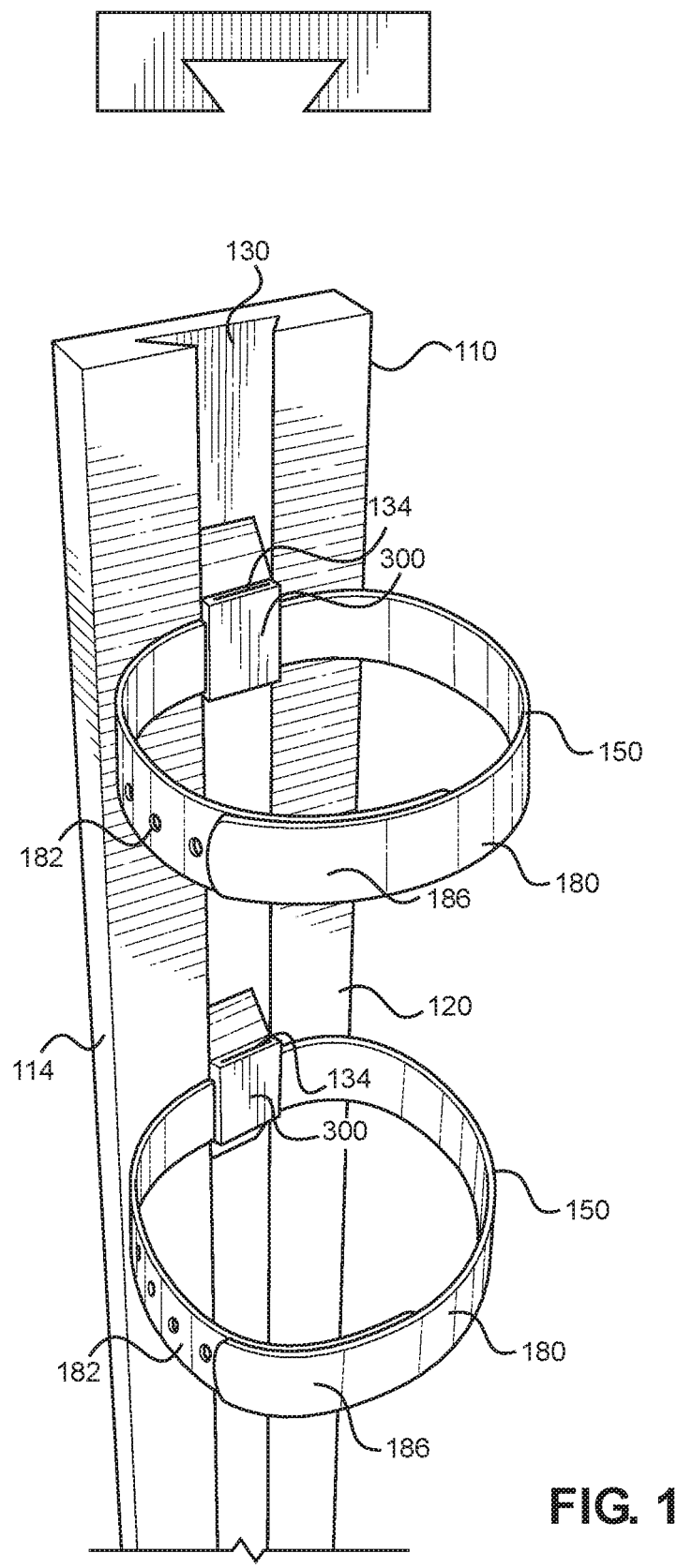
FIG. 1 shows a perspective view illustrating a Room and Shop Organizer according to an embodiment of the present invention.

As discussed above, embodiments of the present invention relate to an organizer device and more particularly to a room and shop organizer comprising a wall-mounted horizontal track with attachable, adjustable rings for holding stored items structured and arranged for storing and organizing elongated, bulky items on a wall, instead of keeping such items lying around on the floor to provide both homeowners and trades workers with a simple and effective means of keeping these items neatly stored above floor surfaces, keeping small living and work spaces free of clutter while avoiding dangerous tripping hazards.

Generally speaking, the Room and Shop Organizer comprises a specially designed shelving system configured specifically for storing and organizing elongated, bulky items on a wall, in lieu of keeping such items on floor surfaces. As a result, small living and work spaces would be free of clutter while potentially dangerous tripping hazards could be avoided.

Fabricated of a durable, high quality ABS plastic material, the Room & Shop Organizer would consist of two (2) parts: the base and a selection of attachable security rings. The base would be rectangular in shape, measuring approximately six feet (6') in length, four to six inches (4"-6") in width, and one to one and one quarter inches (1"-1¼") in depth. In the center of this component, a narrow channel niche would be provided to accommodate the system's security rings.

Braced with a square extension that allows them to snap into the base channel, two to three (2-3) plastic straps would contain adjustable peg holes that would allow the straps to form a secure ring, between four and ten inches (4"-10") in circumference, around the objects that would be stored with the Room & Shop Organizer. To use, the user would choose a wall area to install the Organizer, whether a space in a workshop garage, a laundry room wall, or commercial wood shop.

The base of the unit could be mounted onto the wall in a vertical or horizontal fashion, depending upon the amount of space available. Next, the user would select the items that need to be stored away. Such unwieldy, oblong materials could include, but are certainly not limited to, planks of wood, lengths of pipe, rolls of vinyl flooring or carpeting, oversized ladders, and long-handled garden and cleaning tools, just to name a few of the many possibilities. The items would be secured onto the Room & Shop Organizer via the strong, adjustable rings, which would steadfastly keep the items in place until they are removed by the user.

Created with ultimate convenience and safety in mind, the Room & Shop Organizer system would provide consumers with an effective and multifunctional means of maximizing small and crowded living and work spaces. This accessory would offer a highly functional shelving surface, without compromising existing surface space. Handily suspending elongated items off the floor, this product would eliminate the risk of tripping over pipes, wooden beams, long tools, and other goods, eradicating the possibility of injury. An invaluable addition to any home or even business, the Room & Shop Organizer should enjoy an extremely wide and varied market potential.

Figure 2:
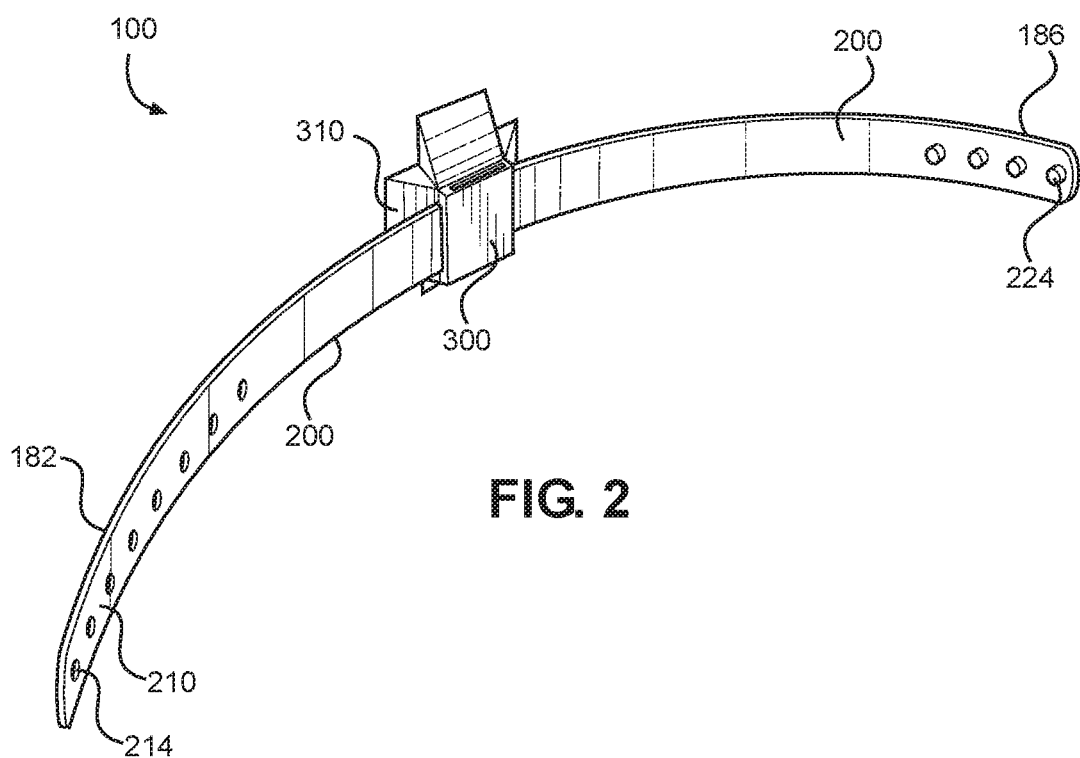
FIG. 2 is a perspective view illustrating an elongated strap member of each of said plurality of ring holders having two strap portions according to an embodiment of the present invention of FIG. 1.
Figure 3:
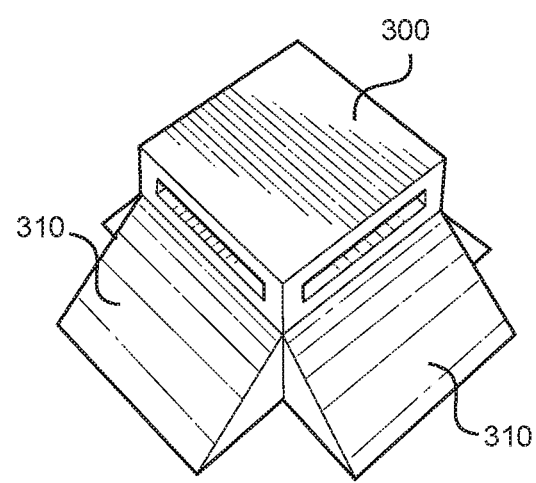
FIG. 3 is a perspective view illustrating a connector member are formed having interdigitating shapes according to an embodiment of the present invention of FIG. 1.

Referring to the drawings by numerals of reference there is shown in FIGS. 1-3, perspective views illustrating room and shop organizer 100 according to an embodiment of the present invention.

A room and shop organizer comprising: base member 110 and plurality of ring holders 150. Base member 110 includes an elongated flat back surface 114 and elongated front surface 120. Wherein front surface 120 includes elongated channel 130 therein. Wherein base member 110 is formed having dimensions including six feet (6') in length, between four and six inches (4"-6") in width, and between one and one quarter inches (1"-1¼") in depth. Wherein base member 110 is formed having a rectangular shape. Wherein said base member is formed from a material chosen from a list of materials consisting of wood, metal, plastic, and ceramic.

Figure 4A:
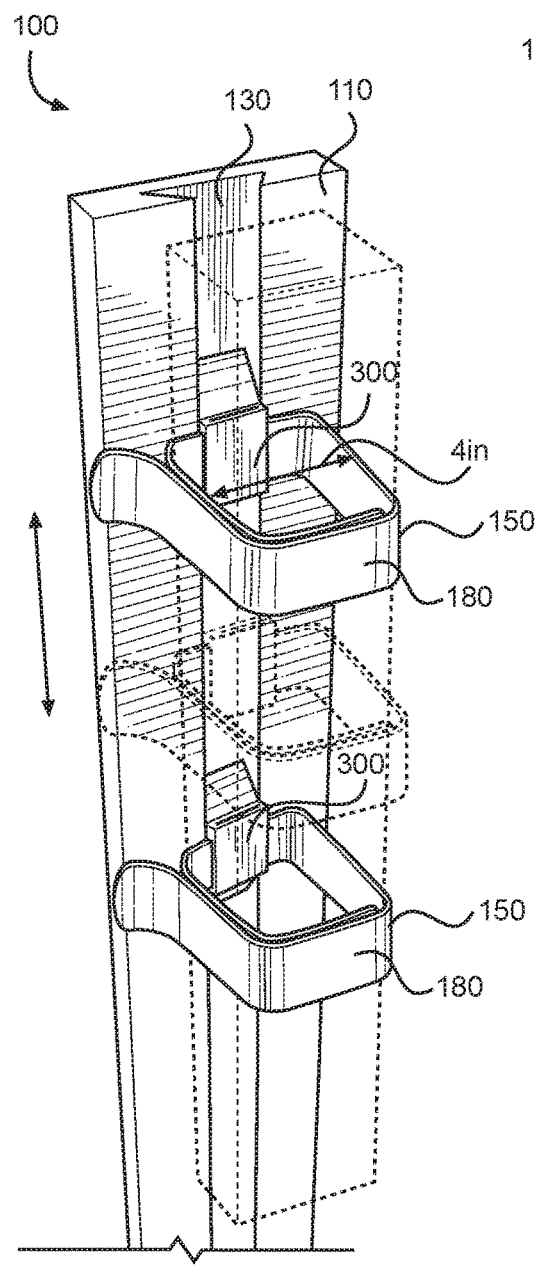
FIG. 4A is a perspective view illustrating plurality of ring holders are adapted to be individually adjustably connected slid and releasably connected within the elongated channel of the base member to hold small sized items according to an embodiment of the present invention of FIG. 1.
Figure 4B:
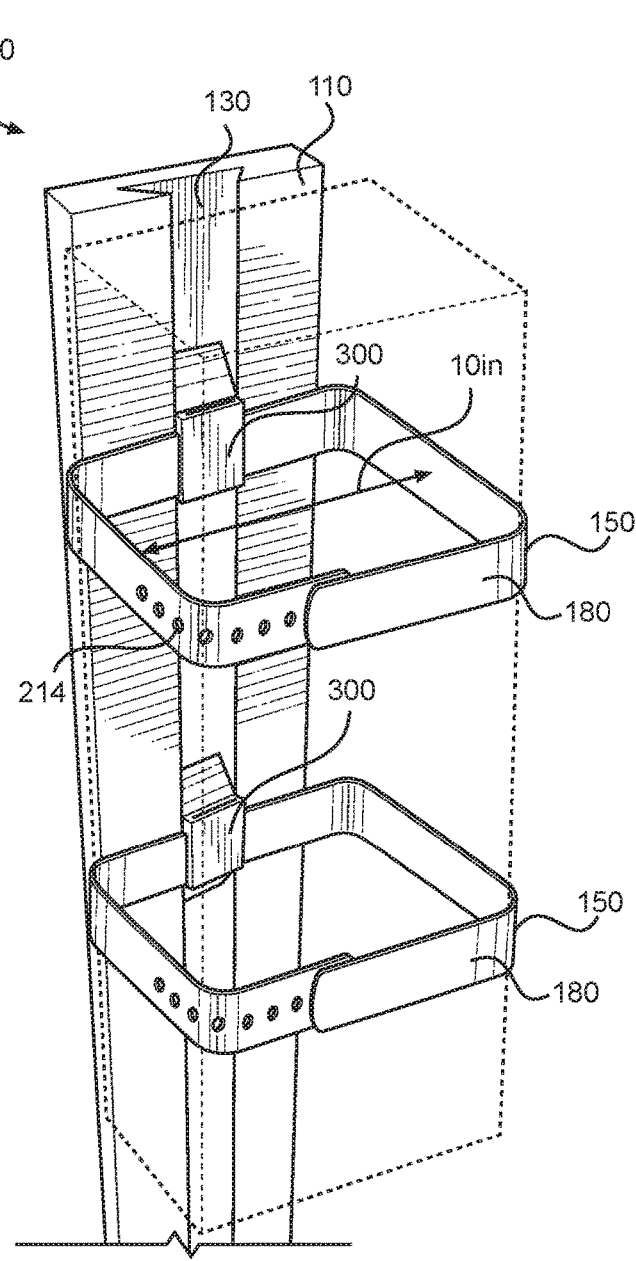
FIG. 4B is a perspective view illustrating plurality of ring holders are adapted to be individually adjustably connected slid and releasably connected within the elongated channel of the base member to hold small sized items according to an embodiment of the present invention of FIG. 1.

Plurality of ring holders 150, each include connector member 300 and elongated strap member 180. Wherein connector member 300 is adapted to be slidably received within elongated channel 130 of base member 130. Wherein connector member 300 is adapted to be releasably secured within elongated channel 130, such that the position of connector member 300 within elongated channel 130 can be adjusted.

Wherein elongated channel 130 and each connector member 300 are formed having interdigitating shapes, such that each connector member 300 can slide and be maintained within elongated channel 130. Wherein elongated channel 130 includes series of spaced retainer members 134 therein; and wherein each connector member 300 includes flexible connector portion 310 thereon adapted to releasably engage with any one of series of spaced retainer members 134, such that each connector member 300 can slide and be maintained within elongated channel 130 at chosen positions via flexible connector portion 310 releasably engaging with series of spaced retainer members. Wherein elongated channel 130 is formed having a rectangular shape; and wherein each connector member 300 of each of plurality of ring holders 150 is formed having a square cross-section adapted to interdigitate with and slide within said elongated channel.

Wherein elongated strap member 180 is attached to connector member 300 and is adapted to releasably secure items to connector member 300. Wherein elongated strap member 180 of each of plurality of ring holders 150 is formed having two strap portions 200 each connected to connector member 300 at respective proximal end portions 182 thereof and are releasably and adjustably connected to one another at respective distal end portions 186 thereof, such that a circumference formed by each respective elongated strap member 180 can be adjusted. Wherein connector member 300 of each of plurality of ring holders 150 is formed from a material chosen from a list of materials consisting of metal, plastic, and ceramic. Wherein plurality of ring holders 150 are adapted to be individually adjustably connected slid and releasably connected within elongated channel 130 of base member 110, such that items of varying shapes and sizes can be releasably secured to base member 110 as shown in FIGS. 4A and 4B.

Wherein first 210 of two strap portions 200 of elongated strap member 180 includes series of spaced apertures 214 therethrough; and wherein second 220 other of two strap portions 200 of elongated strap member 180 includes a plurality of spaced pins 224 extending outwardly therefrom and adapted to releasably engage chosen apertures 214 of first strap portion 210, such that said distal end portions 186 of said of two strap portions 200 can be adjustably and releasably connected to one another via chosen pins 224 within chosen apertures 214 such that the circumference formed by each respective elongated strap member 180 can be adjusted. Wherein the circumference formed by each respective elongated strap member 180 can be adjusted between four and ten inches (4"-10") as show in with a 4-inch circumference in FIG. 4A and a 10-inch circumference in FIG. 4B. Wherein each said elongated strap member 180 is formed from a material chosen from a list of materials consisting of plastic, nylon, and leather.

The embodiments of the invention described herein are exemplary and numerous modifications, variations and rearrangements can be readily envisioned to achieve substantially equivalent results, all of which are intended to be embraced within the spirit and scope of the invention. Further, the purpose of the foregoing abstract is to enable the U.S. Patent and Trademark Office and the public generally, and especially the scientist, engineers and practitioners in the art who are not familiar with patent or legal terms or phraseology, to determine quickly from a cursory inspection the nature and essence of the technical disclosure of the application.

What is claimed is:

1. A room and shop organizer comprising:
    a base member including:
        an elongated flat back surface;
        an elongated front surface;
            wherein said front surface includes an elongated channel therein; and
    a plurality of ring holders, each including:
        a connector member;
            wherein said connector member is adapted to be slidably received within said elongated channel of said base member; and wherein said connector member is adapted to be releasably secured within said elongated channel, such that the position of said connector member within said elongated channel can be adjusted;
        an elongated strap member;
            wherein said elongated strap member is attached to said connector member and is adapted to releasably secure items to said connector member;
    wherein said plurality of ring holders are adapted to be individually adjustably connected slid and releasably connected within said elongated channel of said base member, such that items of varying shapes and sizes can be releasably secured to said base member, each said connector having a series of spaced retainer members such that the respective said elongated strap is configured to be oriented parallel to a longitudinal axis of the base member or perpendicular to said axis without adjusting said connector when said connector is within the elongated channel.

2. The room and shop organizer of claim 1, wherein said elongated channel and each said connector member are formed having interdigitating shapes, such that each said connector member can slide and be maintained within said elongated channel.

3. The room and shop organizer of claim 1, wherein said elongated strap member of each of said plurality of ring holders is formed having two strap portions each connected to said connector member at respective proximal end portions thereof and are releasably and adjustably connected to one another at respective distal end portions thereof, such that a circumference formed by each respective elongated strap member can be adjusted.

4. The room and shop organizer of claim 3, wherein a first of said two strap portions of said elongated strap member includes a series of spaced apertures therethrough; and wherein a second other of said two strap portions of said elongated strap member includes a plurality of spaced pins extending outwardly therefrom and adapted to releasably engage chosen said apertures of said first strap portion, such that said distal end portions of said two strap portions can be adjustably and releasably connected to one another via chosen pins within chosen apertures such that said circumference formed by each respective elongated strap member can be adjusted.

5. The room and shop organizer of claim 1, wherein said base member is formed having a rectangular shape.

6. The room and shop organizer of claim 5, wherein said base member is formed having dimensions including six feet (6') in length, between four and six inches (4"-6") in width, and between one and one quarter inches (1"-1¼") in depth.

7. The room and shop organizer of claim 1, wherein said base member is formed from a material chosen from a list of materials consisting of wood, metal, plastic, and ceramic.

8. The room and shop organizer of claim 1, wherein said connector member of each of said plurality of ring holders is formed from a material chosen from a list of materials consisting of metal, plastic, and ceramic.

9. The room and shop organizer of claim 1, wherein each said elongated strap member is formed from a material chosen from a list of materials consisting of plastic, nylon, and leather.

10. The room and shop organizer of claim 1, wherein said elongated channel is formed having a rectangular shape; and wherein each said connector member of each of said plurality of ring holders is formed having a square cross-section adapted to interdigitate with and slide within said elongated channel.

11. The room and shop organizer of claim 3, wherein said circumference formed by each respective elongated strap member can be adjusted between four and ten inches (4"-10").

* * * * *